June 22, 1965     H. E. SCHULTZE     3,190,400
SHOCK ABSORBER
Filed July 24, 1963
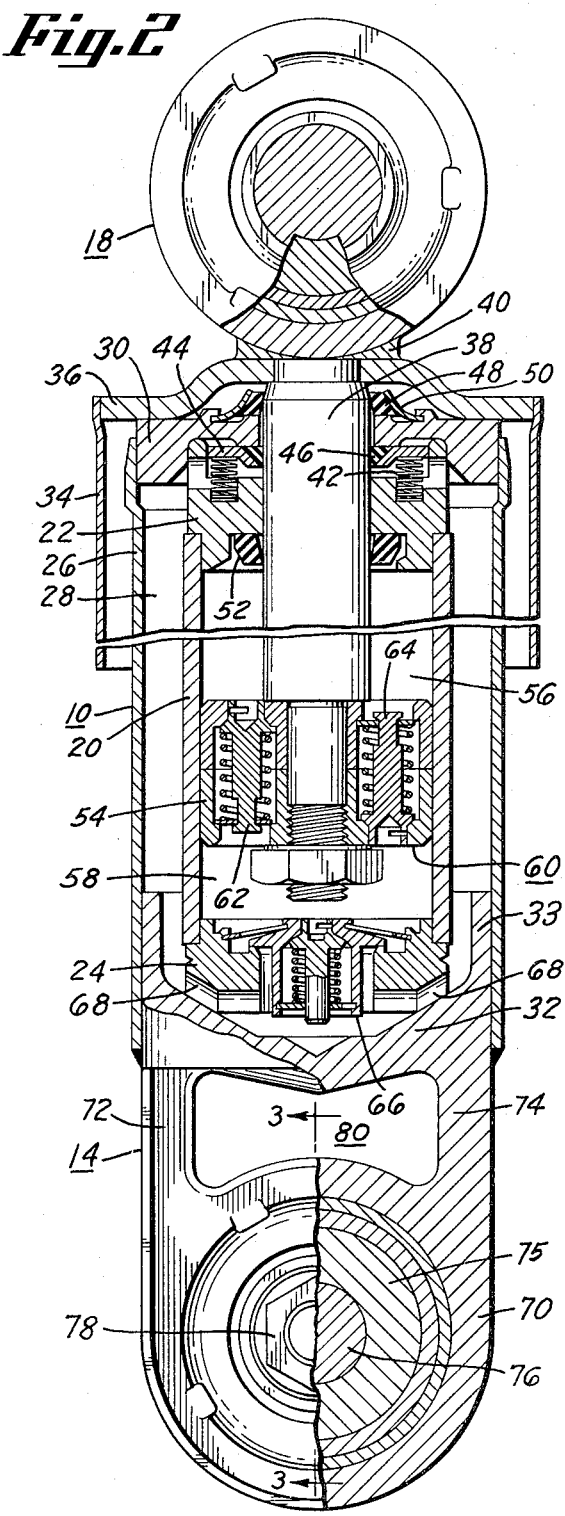
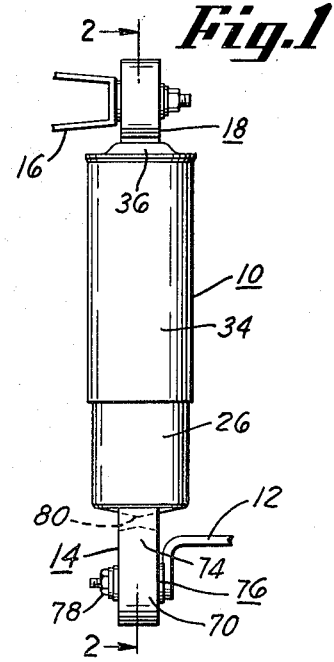
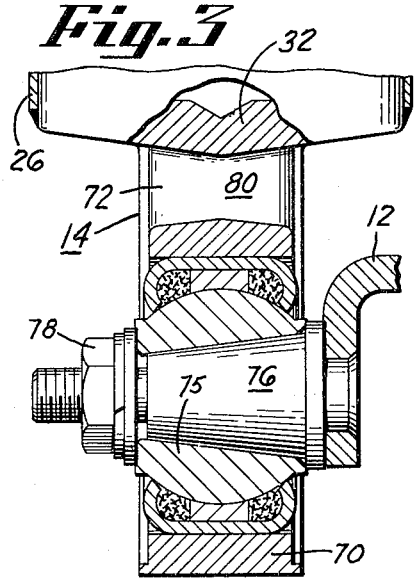
INVENTOR.
HAROLD E. SCHULTZE
BY J. C. Evans
ATTORNEY

United States Patent Office 3,190,400
Patented June 22, 1965

3,190,400
SHOCK ABSORBER
Harold E. Schultze, Dayton, Ohio, assignor to General Motors Corporation, Detroit, Mich., a corporation of Delaware
Filed July 24, 1963, Ser. No. 297,451
1 Claim. (Cl. 188—88)

This invention relates to direct-acting shock absorbers and more particularly to an improved air cooled shock absorber attachment bearing arrangement.

One problem in direct-acting shock absorbers used in vehicles that experience a large number of repetitious shock loadings, for example a vehicle passing over rough terrain, has been that of lower attachment bearing failures attributable to heating of the lower attachment bearing produced in part by the restriction of fluid flow through the base valve of the shock absorber.

Accordingly, an object of the present invention is to provide an air cooled shock absorber arrangement for restricting excessive heating of the lower attachment bearing of a shock absorber during its operation.

A further object of the invention is to provide a mechanically strong interconnection between a lower attachment bearing assembly and a shock absorber that eliminates direct thermal conductive heat transfer between a heat generating base valve assembly and the lower attachment bearing assembly including means for dissipating a substantial portion of the heat generated by the base valve assembly before it reaches the lower attachment bearing.

A still further object of the invention is to provide an economical means for connecting a lower attachment bearing to a shock absorber including means for forming an air space between the lower attachment bearing and a heat generating base valve portion of the shock absorber and a heat conductive path means that only receives a part of the heat generated by the base valve assembly.

Further objects and advantages of the present invention will be apparent from the following description, reference being had to the accompanying drawings wherein a preferred embodiment of the present invention is clearly shown.

In the drawings:

FIGURE 1 is a view in elevation of a shock absorber including the air cooled lower attachment bearing connection of the present invention;

FIGURE 2 is a view in vertical section taken along the line 2—2 of FIGURE 1; and FIGURE 3 is a view in vertical section taken along the line 3—3 of FIGURE 2.

Referring now to FIGURE 1, a direct-acting hydraulic type shock absorber 10 is illustrated having one end thereof secured to a support element 12 by means of an improved lower attachment bearing arrangement 14 and the opposite end thereof connected to a second support element 16 by means of a conventional attachment bearing arrangement 18. Typically, the first support element 12 is secured on an unsprung mass such as the axle housing of a vehicle and the second support element 16 is secured on a sprung mass such as a vehicle chassis and body which is resiliently supported on the unsprung mass by suitable spring means for movement relative thereto with the shock absorber 10 serving to damp movements between the sprung and the unsprung masses that would cause the sprung mass to impact against the unsprung mass during the operation of the vehicle.

The shock absorber 10 is representatively illustrated in FIGURE 2 as including a shock absorber cylinder 20 closed at one end thereof by a rod guide element 22 and at the opposite end thereof by a valve cage element 24. A reservoir tube 26 encloses the shock absorber cylinder 20 and is located in spaced relationship therewith to form a fluid reservoir space 28 closed at one end of the tube 26 by a cap element 30 and at the opposite end thereof by a base closure element or cap portion 32 of the attachment bearing arrangement 14. The cap portion 32 comprises a tubular extension member 33 which is snugly received within reservoir tube 26 to extend upwardly beyond valve cage element 24. The shock absorber further includes a cylindrical dust shield tube 34 closed at one end thereof by a closure element 36 that is secured centrally thereof to one end of an elongated piston rod 38 received within the shock absorber cylinder tube 20 and having one end thereof directed exteriorly of the shock absorber and attached to the upper attachment bearing fitting 18 by suitable means such as welding at 40. The upper end of the rod guide element 22 has springs 42 seated thereon bearing against a retainer 44 for resiliently biasing a sealing element 46 carried thereon against the underside of the closure element 30 to prevent fluid leakage from the shock absorber along the outer periphery of the rod 38. In the illustrated arrangement an additional seal 48 is held against the upper surface of the closure element 30 by means of a leaf spring 50 secured on the upper surface of the element 30 and a still further seal 52 is supported on the undersurface of the rod guide element 22 for providing additional sealing along the rod 38.

A piston element 54 secured on the opposite end of the rod 38 is slidably supported by the shock absorber cylinder tube 20 in sealing engagement therewith to divide the cylinder 20 into an upper rebound chamber 56 and a lower compression chamber 58 filled with a suitable hydraulic fluid that flows across the piston element 54 under the control of a valve assembly 60 for restricting fluid flow between the chambers 56, 58 upon opposite reciprocable movement of the piston 54 therein by the rod 38. The valve assembly 60 includes opposed spring biased valving elements 62, 64 more detailedly set forth in U.S. Patent 2,785,774 issued March 19, 1957 to Long et al. The shock absorber further includes a two-directional base valve assembly 66 supported by the valve cage element 24 for restricting fluid flow between chamber 58 and space 28 through passageways 68 formed between the base valve cage 24 and the bottom closure element 32 during the compression stroke of the shock absorber and for allowing substantially unrestricted fluid flow between the space 28 and the compression chamber 58 on the rebound stroke of the shock absorber. The base valve assembly 66 is more particularly set forth in U.S. Patent 2,583,169 issued June 22, 1952 to Funkhouser and is merely representative of a base valve assembly that will generate substantial heat because of the restriction of fluid flow therethrough during the compression stroke of the shock absorber.

Usually, lower attachment bearings are connected in direct thermal conductive relationship with the base valve assembly of direct-acting shock absorbers. Hence, the heat generated by such base valve assemblies causes lower attachment bearing failures since the heat generated by the base valve assembly passes more or less directly by conduction from the base valve assembly into the lower bearing arrangement to cause a breakdown of the components thereof to produce ever increasing frictional wear therein. This problem is especially prounounced in arrangements where shock absorbers are continually subjected to repetitious rebound and compression strokes, as for example when the shock absorber is used on a cross-country type vehicle subject to severe shock loading conditions.

In accordance with certain concepts of the present invention an improved air cooled mounting of a lower attachment bearing solves the bearing failure problem attributable to the heat generated by the base valve assembly. More particularly, in the illustrated embodiment of the invention a bearing ring 70 having an outside diameter substantially equal to the inside diameter of the reservoir tube 26 is connected to the bottom closure element 32 by spaced strut-like arms 72, 74 each having one of its ends integrally formed with the base closure element 32 at the outer periphery thereof and its opposite end extending tangentially to the outer periphery of the ring 70 and being formed integrally therewith. While the lower attachment bearing 14 is shown as an integral casting, it will be appreciated that an equivalent structure might be assembled by welding suitable components together.

The ring 70 supports a conventional ball socket bearing arrangement 75 that is adapted to receive a spindle 76 secured on the support element 12 to provide for a predetermined angular movement between the shock absorber and its supporting elements. The spindle 76 is connected to bearing 75 by a nut 78 that engages a threaded tip on spindle 76. The ring 70, struts 72, 74 and base closure element 32 form an air cooling space 80 located between the base valve assembly 66 and the bearing ring 70 to thereby locate the socket bearing arrangement 75 therein out of direct heat conductive relationship with the valve assembly 66 and because of the above-described arrangement, any heat generated by the valve assembly 66 that passes by conduction to the bearing 75 must follow a path through the base valve cage 24 and bottom closure element 32 to the outer periphery of the shock absorber where a substantial portion of the generated heat will be conducted into the reservoir tube 26 and shock absorber cylinder 20 and dissipated therefrom by convection to thereby dissipate a substantial portion of the generated heat with only a small portion of the generated heat passing through the struts 72, 74 to the bearing 75. Tubular member 33 extends around and beyond valve cage 24 in contact with tube 26 to completely surround valve cage 24 and provide a significant heat conductive area through the tubular member 33 to cylinder tube 26. The improved air cooled arrangement also allows for further convective discharge of the generated heat as the reduced portion thereof passing through the struts 70, 72 is subjected to convective cooling currents passing through the air space 80.

By virtue of the above-described arrangement, it has been found that lower attachment bearing failures attributable to excessive heat have been substantially eliminated and, accordingly, the expected life of the complete shock absorber assembly including the bearing attachments thereof have been materially increased over arrangements heretofore in use.

While the embodiment of the present invention as herein disclosed constitutes a preferred form, it is to be understood that other forms might be adopted.

What is claimed is as follows:

In a shock absorber, a first cylinder, a second cylinder located concentrically within said first cylinder in spaced relationship therewith for forming a fluid reservoir therebetween, cap means having a tubular member snugly received within said first cylinder for closing one end thereof, base valve means for closing one end of said second cylinder, said cap means' tubular member extending around and beyond said base valve means, said cap means and base valve means cooperating to form a passageway between said second cylinder and said fluid reservoir, said base valve means restricting fluid flow between said second cylinder and said fluid reservoir, a bearing mounting means including a ring portion having an outer diameter substantially equal to the diameter of said first cylinder, said ring portion being located out of direct heat conductive relationship with said cap means and said base valve means, strut elements located on either side of said ring portion directed tangentially therefrom and being attached to said cap element adjacent the outer periphery thereof in alignment with the wall of said first cylinder whereby a portion of the heat generated by said base valve means is dissipated through said tubular member and by said first cylinder before passing through said strut elements, said strut elements and said cap element cooperating to form an air space between said cap element and said ring portion to prevent direct conductive heat flow from said base valve means to said ring portion.

References Cited by the Examiner
UNITED STATES PATENTS

| 1,906,711 | 5/33 | Norton | 188—264 X |
| 2,033,958 | 3/36 | Sauzedde | 188—264 |
| 2,255,181 | 9/41 | Newton | 188—88 X |
| 2,934,332 | 4/60 | Mercier | 267—8 |

FOREIGN PATENTS

| 767,756 | 2/57 | Great Britain. |
| 805,705 | 12/58 | Great Britain. |

References Cited by the Applicant
UNITED STATES PATENTS 2,395,072  2/46  Whisler.

EUGENE G. BOTZ, *Primary Examiner*.